US008606298B2

United States Patent
Ahn et al.

(10) Patent No.: US 8,606,298 B2
(45) Date of Patent: Dec. 10, 2013

(54) SYSTEM AND METHOD FOR TRACKING LOCATION OF MOBILE TERMINAL USING TV

(75) Inventors: Chung Hyun Ahn, Daejeon (KR); Kwi Hoon Kim, Daejeon (KR); Jin Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 20 days.

(21) Appl. No.: 13/334,089

(22) Filed: Dec. 22, 2011

(65) Prior Publication Data
US 2012/0094696 A1    Apr. 19, 2012

(30) Foreign Application Priority Data

Mar. 11, 2010   (KR) .................. 10-2011-0021952
Dec. 23, 2010   (KR) .................. 10-2010-0134100

(51) Int. Cl.
   *H04W 24/00*      (2009.01)
(52) U.S. Cl.
   USPC ............... 455/456.2; 455/456.1; 455/457; 455/411; 455/550.1
(58) Field of Classification Search
   USPC ............ 455/456.1, 456.2, 457, 411, 550.1; 342/357.3
   See application file for complete search history.

(56) References Cited

U.S. PATENT DOCUMENTS

| | | | | |
|---|---|---|---|---|
| 7,493,139 B2 * | 2/2009 | Himeno | ................... | 455/550.1 |
| 2006/0227047 A1 * | 10/2006 | Rosenberg | ............... | 342/357.13 |
| 2009/0149192 A1 * | 6/2009 | Vargas et al. | .............. | 455/456.1 |
| 2010/0188210 A1 | 7/2010 | Howard et al. | | |
| 2011/0159845 A1 * | 6/2011 | Sanjeev | ...................... | 455/411 |
| 2012/0231810 A1 * | 9/2012 | Lisitsa et al. | .............. | 455/456.1 |

FOREIGN PATENT DOCUMENTS

| | | | |
|---|---|---|---|
| JP | 2000-354268 A | 12/2000 | |
| KR | 10-2000-0028351 A | 5/2000 | |
| KR | 10-2005-0094580 A | 9/2005 | |
| KR | 569153 B1 * | 4/2006 | |
| KR | 10-2006-0072621 A | 6/2006 | |
| KR | 10-2008-0079411 A | 9/2008 | |

* cited by examiner

*Primary Examiner* — David Q Nguyen
(74) *Attorney, Agent, or Firm* — Rabin & Berdo, P.C.

(57) ABSTRACT

The present invention relates to a system and a method for tracking a location of a mobile terminal, and more particularly, to a system and a method for tracking a location of a mobile terminal using a TV connected to the Internet. The system for tracking a location of a mobile terminal according to an exemplary embodiment of the present invention includes: a TV connected to the Internet; and at least one mobile terminal acquiring its own location information, wherein the mobile terminal transmits its own location information to the TV in a peer-to-peer communication scheme, and the TV receives the location information to display the received location information on a screen.

18 Claims, 7 Drawing Sheets

SYSTEM AND METHOD FOR TRACKING LOCATION OF MOBILE TERMINAL USING TV

CROSS-REFERENCE TO RELATED APPLICATIONS

This application claims priority to and the benefit of Korean Patent Application No. 10-2010-0134100 and 10-2011-0021952 filed in the Korean Intellectual Property Office on Dec. 23, 2010 and Mar. 11, 2011, the entire contents of which are incorporated herein by reference.

TECHNICAL FIELD

The present invention relates to a system and a method for tracking a location of a mobile terminal, and more particularly, to a system and a method for tracking a location of a mobile terminal using a TV connected to the Internet.

BACKGROUND ART

As a technology for accurately measuring a location on the ground, a global positioning system (GPS) technology using an artificial satellite has been prevalently used.

In recent years, the GPS technology is widely propagated among the people and thus, has been applied for car navigation, mobile communication terminals, climbing GPS equipment, etc. A location based service industry based on the GPS technology has been rapidly grown. As an alternative plan for GPS failure in a GPS shadow area in which a satellite signal is weakly sensed, various types of network based positioning systems have been developed.

Examples of the network based positioning technologies may include an MS-Assisted method in which a terminal receives necessary information and then a location server calculates an end location of the terminal, an MS-based method in which a terminal receives information necessary for positioning from the location server and then, performs the last positioning, and an autonomous method in which a terminal performs positioning without the help of a location server.

The positioning of the MS-based method or the autonomous method is the most recently commercialized technologies and the existing LBS service mainly uses the MS-assisted based positioning. Consequently, the terminal location information provision by the existing LBS service follows a location server based call flow.

The aforementioned location server based location information providing service is suitable for a disposable location inquiry service such as a my location inquiry or a friend search, but is not suitable for a periodic location inquiry service.

Recently, a terminal based service such as a car navigation system (CNS) or a personal navigation system (PNS) due to the introduction and commercialization of positioning technologies such as the MS-based method or the autonomous method has been developed. The terminal based location providing service is a service in which the terminal periodically measures its own location and use the measured location, which is an impossible service in the existing location server based location tracking system.

However, even in the case of the service, the terminal uses only its own location. Therefore, when intending to periodically inquire and use a location of another person, there is still a need to use the location server based location tracking system, which leads to a problem in greatly increasing the load of the server or the network and limiting the function and quality of service.

The terminal based location tracking service inquiring the location of another person is implemented based on a method of acquiring location information on a tracked terminal by driving a period management and positioning system in an existing location based service platform (LBSP) and providing the acquired location information to a tracking terminal. In the method, when the tracked terminal performs the positioning of the MS-based method and the terminal performs the period management, the location server simply serves to receive the location information calculated in the tracked terminal from the tracked terminal to transmit the calculated location information to a tracking terminal and thus, the unnecessary communication between the terminal and the location server is frequent and the terminal needs to manage the period management, or the like and thus, the unnecessary load of the server and the network is increased.

Further, since the location service is essential and all the data are processed in the location server, the high-performance equipment is required.

In addition, the related art has a problem in that the personal information such as the location information of the user, or the like, is published to other persons and location information providers.

Moreover, the related art as the location tracking system of a user based protocol has not proposed a preferred processing method for a case in which the terminal user does not answer a location tracking acknowledgement request and thus, has a problem in performing the location tracking procedure.

SUMMARY OF THE INVENTION

The present invention has been made in an effort to a system and a method for tracking a location of a mobile terminal by transferring location information through direction communication between a tracked terminal and a tracking terminal to reduce unnecessary communication between a terminal and a server, thereby reducing a load of a server or a network and improving efficiency.

The present invention has been made in an effort to provide a system and a method for tracking a location of a mobile terminal capable of reducing intervention of a location server as maximally as possible or operating a service without a location server.

The present invention has been made in an effort to a system and a method for tracking a location of a mobile terminal capable of preventing personal information such as location information, or the like, from being published to location information providers.

An exemplary embodiment of the present invention provides a system for tracking a location of a mobile terminal, including: a TV connected to the Internet; and at least one mobile terminal acquiring its own location information, wherein the mobile terminal transmits its own location information to the TV in a peer-to-peer communication scheme, and the TV receives the location information to display the received location information on a screen.

The system for tracking a location of a mobile terminal may further include a gateway server connected to the Internet, wherein the mobile terminal may transmit the location information to the TV through the gateway server when the mobile terminal is not available to the TV in the peer-to-peer communication scheme.

The mobile terminal may code the location information to transmit the coded location information to the TV.

The mobile terminal may periodically transmit the location information to the TV.

The TV may transmit a location information request message to the mobile terminal and the mobile terminal may transmit the location information to the TV in response to the location information request message.

When the location of the mobile terminal deviates from a pre-established route, the TV may transmit a warning message by a preset number.

When the location of the mobile terminal enters a pre-established area, the TV may transmit a warning message by a preset number.

The TV may transmit an additional information request message to the mobile terminal and the mobile terminal may transmit pictures or moving pictures to the TV in response to the additional information request message.

The system for tracking a location of a mobile terminal may further include: a location tracking service platform connected to the Internet, wherein the TV transmits a CCTV information request message to the location tracking service platform, and the location tracking service platform acquires videos photographed by CCTVs around the mobile terminal to transmit the acquired videos to the TV.

The TV may display a location of another mobile terminal connected to the mobile terminal, together with the location of the mobile terminal.

Another exemplary embodiment of the present invention provides a method for tracking a location of a mobile terminal, including: acquiring, by at least one mobile terminal, its own location information; transmitting, by the mobile terminal, the location information to a TV connected to the Internet in a peer-to-peer communication scheme; and receiving, by the TV, the location information to display the received location information on a screen.

The method for tracking a location of a mobile terminal may further include transmitting the location information to the TV through a gateway server connected to the Internet when the mobile terminal is not available to the TV in the peer-to-peer communication scheme.

The method for tracking a location of a mobile terminal may further include: transmitting, by the TV, a location information request message to the mobile terminal; and transmitting, by the mobile terminal, the location information to the TV in response to the location information request message in the peer-to-peer communication scheme.

The method for tracking a location of a mobile terminal may further include: transmitting, by the TV, a warning message by a preset number when the location of the mobile terminal deviates from a pre-established route.

The method for tracking a location of a mobile terminal may further include: transmitting, by the TV, a warning message by a preset number when the location of the mobile terminal enters a pre-established area.

The method for tracking a location of a mobile terminal may further include: transmitting, by the TV, an additional information request message to the mobile terminal, and transmitting, by the mobile terminal, pictures or moving pictures to the TV in response to the additional information request message.

The method for tracking a location of a mobile terminal may further include: transmitting, by the TV, a CCTV information request message to a location tracking service platform connected to the Internet; and acquiring, by the location tracking service platform, videos photographed by CCTVs around the mobile terminal to transmit the acquired videos to the TV.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
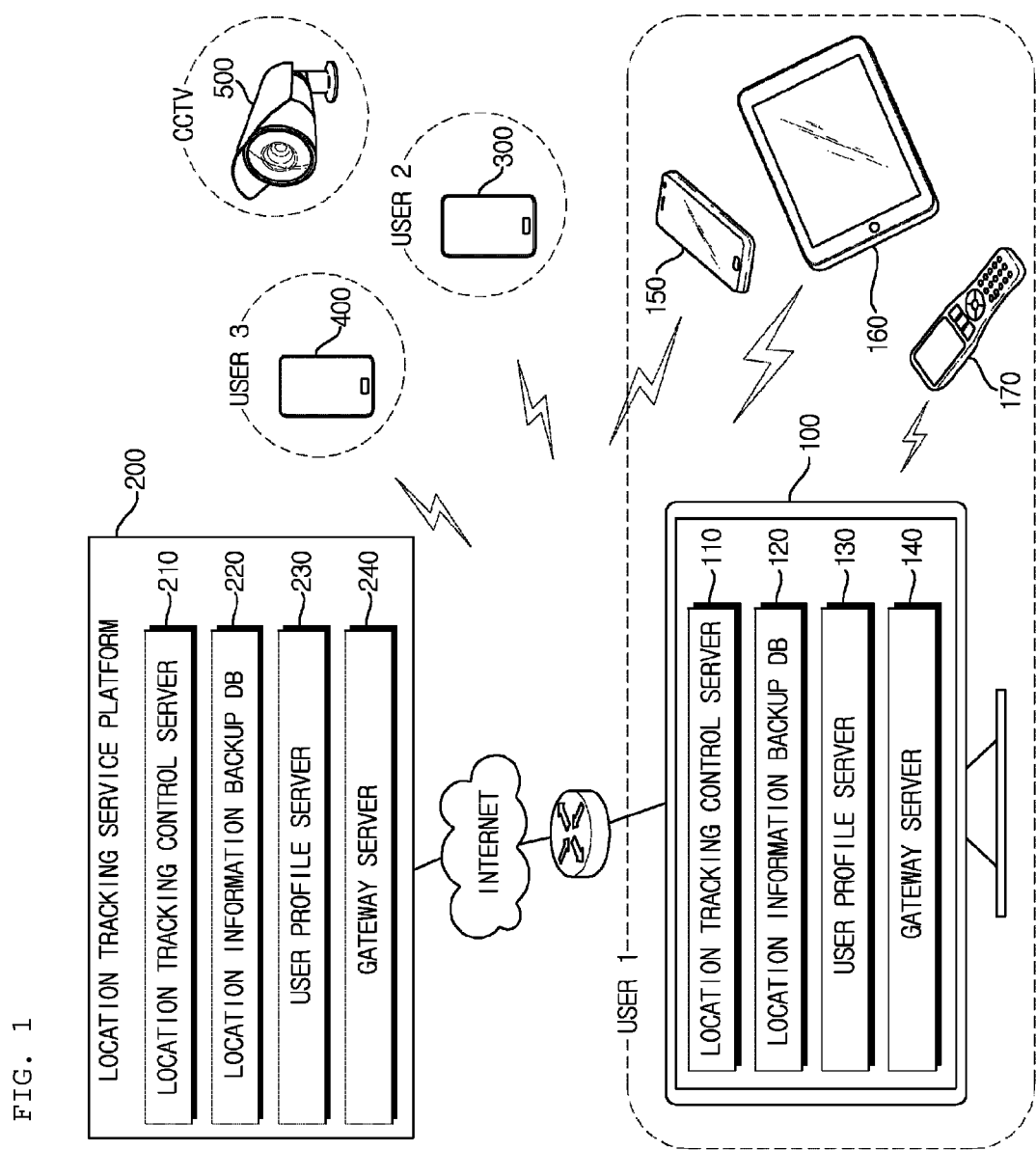
FIG. 1 is a diagram showing an overall configuration of a system for tracking a location of a mobile terminal according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

FIG. 1 is a diagram showing an overall configuration of a system for tracking a location of a mobile terminal according to an exemplary embodiment of the present invention. In the exemplary embodiment of the present invention, user 1 is a 'location information requestor' that intends to inquire a location of user 2 or user 3 and user 2 and user 3 each are a 'location information provider' that notifies user 1 of their own locations.

User 1 is provided with a TV 100 connected to the Internet and user 2 and user 3 each are provided with mobile terminals 300 and 400. The TV 100 is a TV connected to the Internet and includes a smart TV, an IPTV, a connected TV, an Internet TV, or the like. The TV 100 may change or expand its own functions through application programs. Therefore, the exemplary embodiments of the present invention will be described on the assumption that the TV is a smart TV for convenience. The smart TV 100 is connected to the Internet, and may be connected to a fixed network.

The mobile terminals 300 and 400 acquire their own location information based on a GPS technology or a network based positioning technology. The mobile terminals 300 and 400 may also change or expand the functions through the application programs and therefore, the exemplary embodiments will be described on the assumption that the mobile terminals are a smart phone for convenience. The smart phone 300 of user 2 and the smart phone 300 of user 2 and the smart phone 400 of user 2 will be described. However, the mobile terminals 300 and 400, which are a movable terminal capable of acquiring the location information, may be a tablet PC, a navigation device, or the like, and therefore, are not limited to the smart phone. The mobile terminals 300 and 400 are also connected to the Internet and are connected to a mobile network.

The smart phone 300 transmits and receives data to and from the smart TV 100 in a peer-to-peer communication scheme. In detail, the smart phone 300 transmits a terminal ID, location information, and various messages to the smart TV 100 and the smart TV 100 transmits its own MAC address, an IP address, and various messages to the smart phone 300.

The smart phone 300 is installed with application programs for transmitting the acquired location information to the smart TV 100 and the smart TV 100 is installed with the application programs that may interlock the location information received from the smart phone 300 with a web map (for example, a Google map). When the smart phone 300 transmits its own location information to the smart TV 100 in the peer-to-peer communication scheme, the smart TV 100 receives the location information and interlocks the location information with the web map, thereby displaying the location information on a screen.

The system for tracking a location of a mobile terminal is provided with a location tracking service platform 200 that is connected to the Internet to serve as an Internet gateway and to perform a location tracking service. The location tracking serviced platform 200 may be provided by location tracking service providers. The smart phone 300 transmits the location information to the smart TV 100 via the location tracking service platform 200 when it is impossible to perform the peer-to-peer communication with the smart TV 100 due to the network environment. The location tracking service platform 200 serves to track the position of the smart phone 300 and backup the location information when it is impossible to perform the communication between the smart phone 300 and the smart TV 100 or a power supply of the smart TV 100 is turned-off and serves to replace the function of the smart TV 100, such as transmitting a warning message to the smart phone 300, as necessary.

The location tracking service platform 200 serves to form and manage connection between the mobile terminal of the location information provider and the smart TV of the location information requestor. The smart TV may also receive and provide the location information from several mobile terminals when the single smart TV is interlocked with several mobile terminals and each smart TV may also provide the location of the corresponding mobile terminal by allowing the mobile terminal to transmit the location information to several smart TVs when several smart TVs are interlocked to the single mobile terminal.

As shown, the smart TV 100 may be configured to include a location tracking control server 110, a web map interlocking server 120, a location information DB 130, and a location service configuration DB 140. The location tracking control server 110 analyzes the location information received from the smart phone 300 or the location tracking service platform 200 to track the location of the smart phone 300. The web map interlocking server 120 interlocks the web map transmitted through the Internet with the location of the smart phone 300. The location information DB 130 databases and stores the location information of the smart phone 300 for a predetermined period of time of the past. The location service configuration DB 140 configures and provides the location service provided by the system for tracking a location of a mobile terminal.

User 1 may be provided with a remote controller 170, a smart phone 150, a tablet PC 160, or the like, in addition to the smart TV 100. The remote controller 170, which is a smart remote controller, serves to control the smart TV 100. User 1 mainly monitors the position of the mobile terminal to be inquired through the smart TV 100, but may monitor the position of the mobile terminal by using the smart phone 150 or the tablet PC 160 when user 1 is far away from the smart TV 100 or is on the move. The smart phone 150 or the tablet PC 160 may receive the location information of the mobile terminal from the smart TV 100 through short distance wireless communication such as WiFi or Bluetooth to display the received location information on a screen. When it is impossible to perform the short distance wireless communication with the smart TV 100 or the power supply of the smart TV 100 is turned-off, the smart phone 150 or the tablet PC 160 may act for the smart TV 100. That is, the smart TV 100 directly receives the location information from the smart phone 300 or receives the location information through the location tracking service platform 200 and interlocks with the web map, thereby displaying the location information on the screen.

In detail, the location tracking service platform 200 may be configured to include a location tracking control server 210, a location information backup DB 220, a user profile server 230, and a gateway server 240. The gateway server 240 receives the location information from the smart phone 300 when it is impossible to perform the peer-to-peer communication between the smart phone 300 and the smart TV 100 due to the network environment and transmits the received location information to the smart TV 100. The user profile server 230 manages the profile of the location information requestor and the location information provider and the information of the mobile terminal corresponding thereto. The location tracking control server 210 and the location information backup DB 220 act for the location tracking control server 110, the location information DB 130, and the location service configuration DB 140 of the smart TV 100 when the smart TV 100 cannot be operated due to the turn-off of the power supply of the smart TV 100, or the like.

A standard of the message transmitted among the smart TV 100, the smart phone 300, and the location tracking service platform 200 may newly define a packet based on TCP or UDP and may also use a stable protocol such as the existing SIP, DIAMETER, or the like.

The exemplary embodiment of the present invention may use a CCTV 500 provided by public institutions as an auxiliary unit of the location tracking service to provide videos around the location information provider to the location information requestor.

Figure 2:
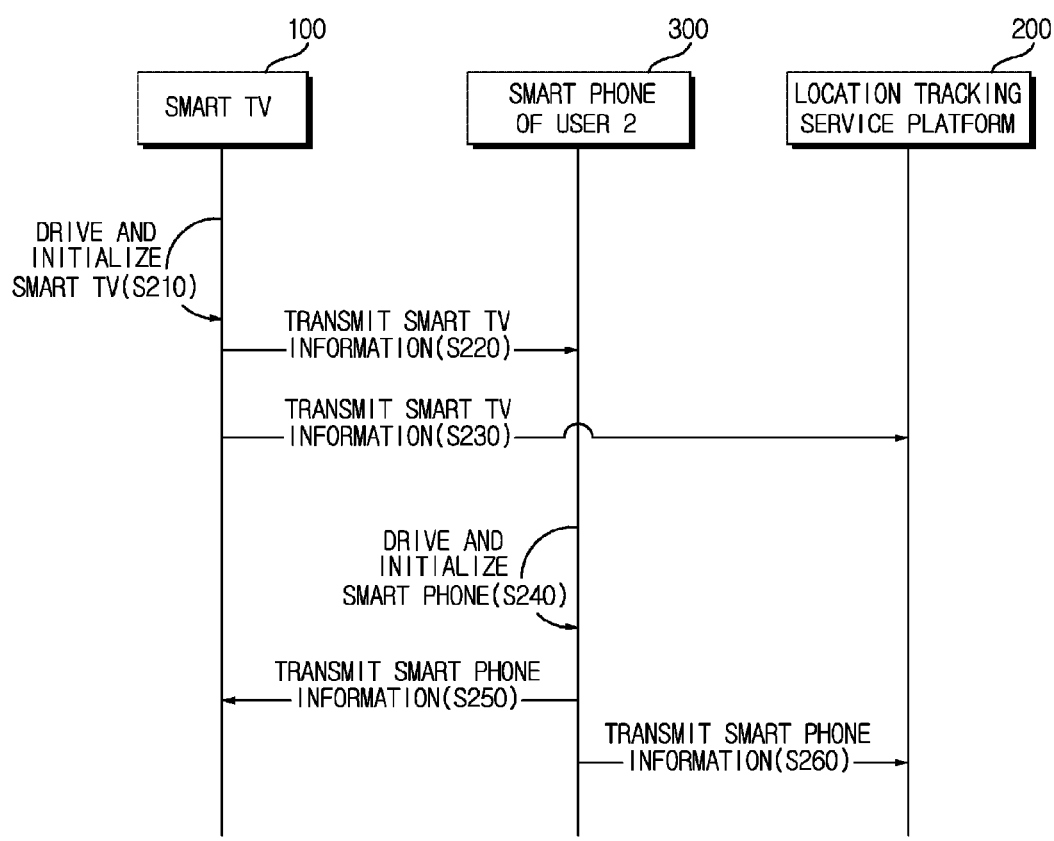
FIG. 2 is a flow chart showing an initialization process of a location tracking service according to the exemplary embodiment of the present invention.

FIG. 2 is a flow chart showing an initialization process of the location tracking service according to the exemplary embodiment of the present invention.

In the exemplary embodiment of the present invention, the connection between the smart TV 100 and the smart phone 300 is formed based on an arbitrarily generated IP address and when the smart TV 100 and the smart phone 300 are assigned with a new IP address, the smart TV 100 and the smart phone 300 transmit the corresponding information to a pre-specified gateway server 240.

Referring to FIG. 2, driving the smart TV and configuring the initial service are performed in the smart TV 100 (S210). At S210, the smart TV 100 establishes information on the location information requestor.

Examples of the information on the location information requestor may include a requestor ID or an MAC address of the smart TV 100, and an authorized IP address, an authorized port number, a code, an emergency mobile phone number, or the like, of the smart TV 100. The smart TV 100 establishes information on the location information provider. Here, the number of location information providers may be plural. Examples of the information on the location information provider may include a provider ID or an MAC address of the smart phone 300, a mobile phone number and a code of the smart phone 300, and an authorized IP, an authorized network or not, or the like, of the smart phone 300. However, values corresponding to the authorized IP and the authorized network or not of the smart phone 300 may be established when a connection of the smart phone 300 of the location information provider 300 is tried later.

The smart TV 100 establishes the information on the gateway server 240 of the location tracking service platform 200. The information on the gateway server includes the authorized IP and the authorized port number. Here, the authorized IP and the authorized port number of the gateway server may be established in the environment in which the smart TV 100 cannot be listened with the authorized IP and the authorized port.

The smart TV 100 transmits the smart TV information to the smart phone 300 and the location tracking service platform 200 of user 2 (S220 and S230). Examples of the smart TV information may include the requestor ID and the MAC address, the authorized IP address, the authorized port number, or the like, of the smart TV 100. The smart TV information is transmitted to the smart phone 300 and the location tracking service platform 200 even when the authorized IP address or the authorized port number of the smart TV 100 is changed, in addition to initialization. The smart TV 100 may send the corresponding information using an SMS character when transmitting the smart TV information using the smart phone 300. In this case, a calling number may be established to a predefined service number (for example: 8282).

The smart phone 300 performs driving and initializing the smart phone (S240). The smart phone 300 establishes the requestor ID of the location information requestor, the authorized IP address, and the authorized port number according to the smart TV information received at S220. The smart phone 300 can appreciate that the corresponding SMS character is about the smart TV information by confirming that the calling number of the received SMS character is the predefined service number (for example: 8282). The smart phone 300 establishes the information on the location information provider.

Examples of the information on the location information provider may include a provider ID or the MAC address of the smart phone 300, and the mobile phone number, the authorized IP address, direct communication or not, or the like, of the smart phone 300. When the smart phone 300 is present in the authorized network, the smart TV 100 and the smart phone 300 can implement the direct communication, that is, the peer-to-peer communication.

The smart phone 300 transmits the information on the smart phone of user 2 to the smart TV 100 and the location tracking service platform 200 (S250 and S260). The information on the smart phone may include the provider ID or the MAC address of the smart phone, and the mobile phone number, authorized ID address, or the like, of the smart phone. The information on the smart phone information is transmitted to the smart TV 100 and the location tracking service platform 200 even when the authorized IP address or the authorized port number of the smart TV 300 is changed, in addition to initialization.

Figure 3:
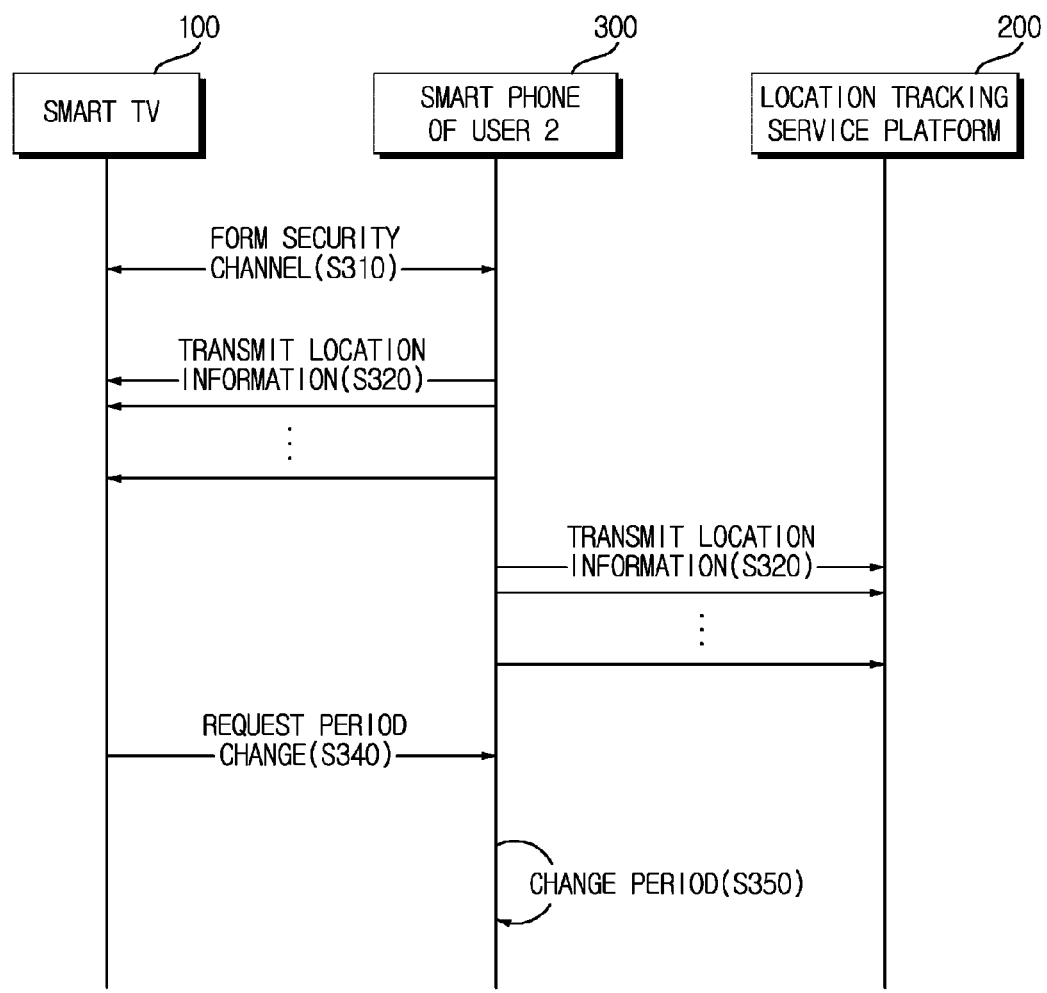
FIG. 3 is a flow chart showing a location registration process of location information providers in a location tracking service according to the exemplary embodiment of the present invention.

FIG. 3 is a flow chart showing a location registration process of the location information provider in a location tracking service according to an exemplary embodiment of the present invention.

Referring to FIG. 3, the smart TV 100 and the smart phone 300 of user 2 form a security channel (S310). In detail, the smart TV 100 provides a key value to the smart phone 300 and the smart phone 300 uses the key value to transmit the provider ID, the provider ID/code/hash function output value of a public key. Therefore, the security channel is formed between the smart TV 100 and the smart phone 300 and thus, the location information of the smart phone 300 is coded and then, is transmitted to the smart TV 100.

The smart phone 300 periodically transmits the location information to the smart TV 100 to register the location in the smart TV 100 (S320). In this case, the transmitted information includes the provider ID or the MAC address of the smart phone, the IP address of the smart phone, and a latitude, a longitude, time, or the like, as current location information. In some cases, additional data such as messages, pictures, moving pictures, or the like, may be included and destination information may be included when a destination is previously established. When a period in which the location information is transmitted is previously established through the smart TV 100 by user 1, the smart TV 100 may transmit period information to the smart phone 300 so as to be established in the smart phone 300.

If the smart TV 100 is in a non-available state such as the turn-off of the power supply of the smart TV 100, or the like, or the smart phone 300 and the smart TV 100 cannot perform the peer-to-peer communication according to the network environment, the smart phone 300 transmits the location information to the gateway server 240 of the location tracking service platform 200, instead of the smart TV 100 (S330). The gateway server 240 transmits the location information received from the smart phone 300 to the corresponding smart TV 100 when the smart TV 100 is operated. However, when the smart TV 100 is not in the available state, the location tracking service platform 200 acts for the smart TV 100.

The smart TV 100 may change the location information transmission period of the smart phone 300 according to the request of user 1. To this end, the smart TV 100 transmits a period change request message to smart phone 300 of user 2 (S340) and the smart phone 300 changes a location information transmission period in response to the period change request message (S350). As such, the location information requestor may confirm the position of the location information requestor as rapidly as possible by changing the location information transmission period according to the request of the location information requestor.

Figure 4:
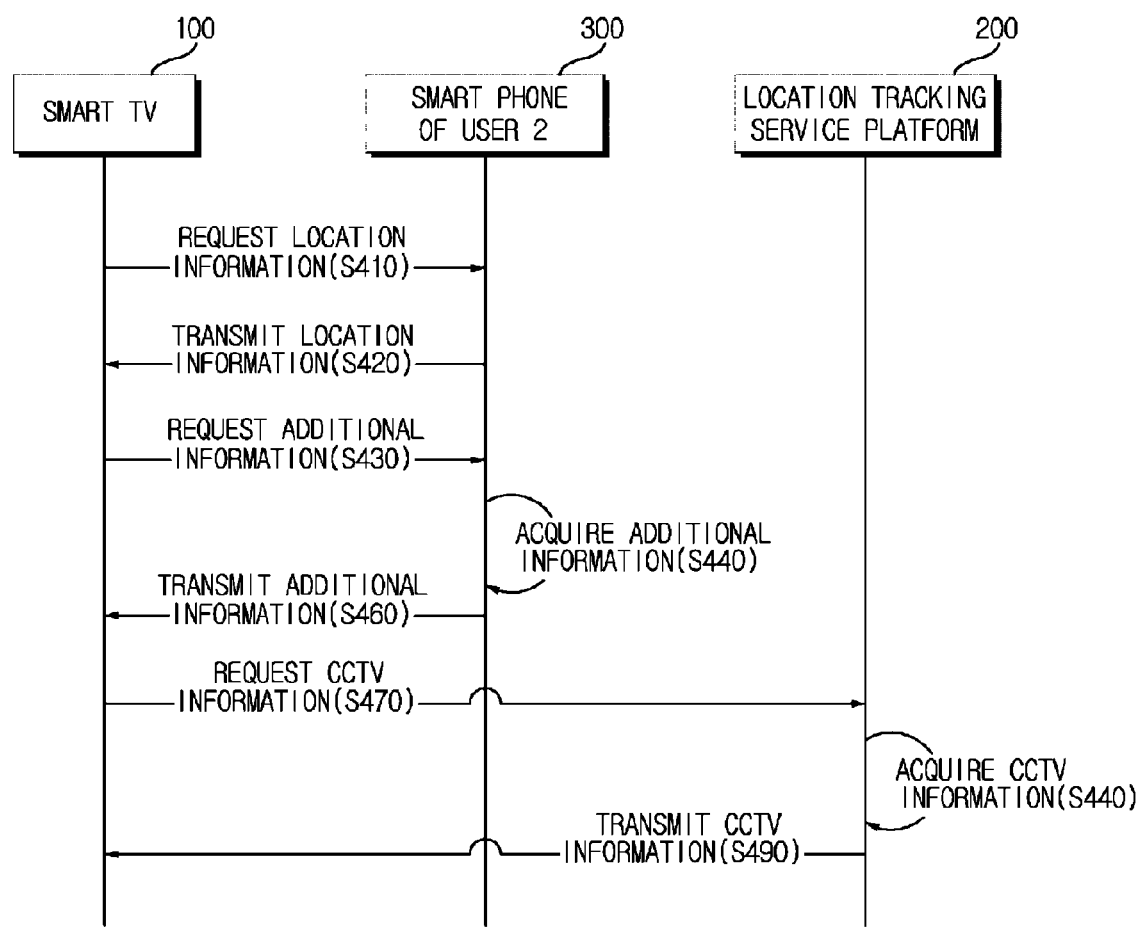
FIG. 4 is a flow chart showing a location information request and an additional information request process in the location tracking service according to the exemplary embodiment of the present invention.

FIG. 4 is a flow chart showing a location information request and an additional information request process in the location tracking service according to the exemplary embodiment of the present invention.

The smart TV 100 transmits the location information request message to the smart phone 300 (S410). When the smart phone 300 receives the location information request message, the smart phone 300 transmits the current location information in response to the received location information request message (S420). Basically, the smart phone 300 periodically transmits the location information to the smart TV 100 but the location information requestor may immediately receive the location information through a requestor PULL scheme when the location information requestor needs the current location of the location information provider. Therefore, the location information requestor can confirm the location of the location information provider as rapidly as possible, as necessary.

The smart TV 100 transmits the additional information request message to the smart phone 300 (S430). The additional information may include picture information, moving picture information, or the like. When the smart phone 300 receives the additional information request message, the smart phone 300 photographs pictures or photographs moving pictures in response thereto to acquire the additional information such as the picture information, the moving picture information, or the like (S440). The smart phone 300 transmits the additional information, such as the picture information, the moving picture, or the like, to the smart TV 100 (S460).

The smart TV 100 transmits the CCTV information request message to the location tracking service platform 200 (S470). The location tracking service platform 200 confirms the location of the corresponding smart phone 300 in response to the CCTV information request message and acquires video information photographed by CCTVs around the smart phone 300 (S480). The location tracking service platform 200 transmits CCTV video information to the smart TV 100.

In the exemplary embodiment of the present invention, when the peer-to-peer communication cannot be performed between the smart TV 100 and the smart phone 300 according to the network environment, the aforementioned location information request message, location information, additional information request message, and additional information are transmitted between the smart TV 100 and the smart phone 300 via the gateway server 240 of the location tracking service platform 200.

Figure 5:
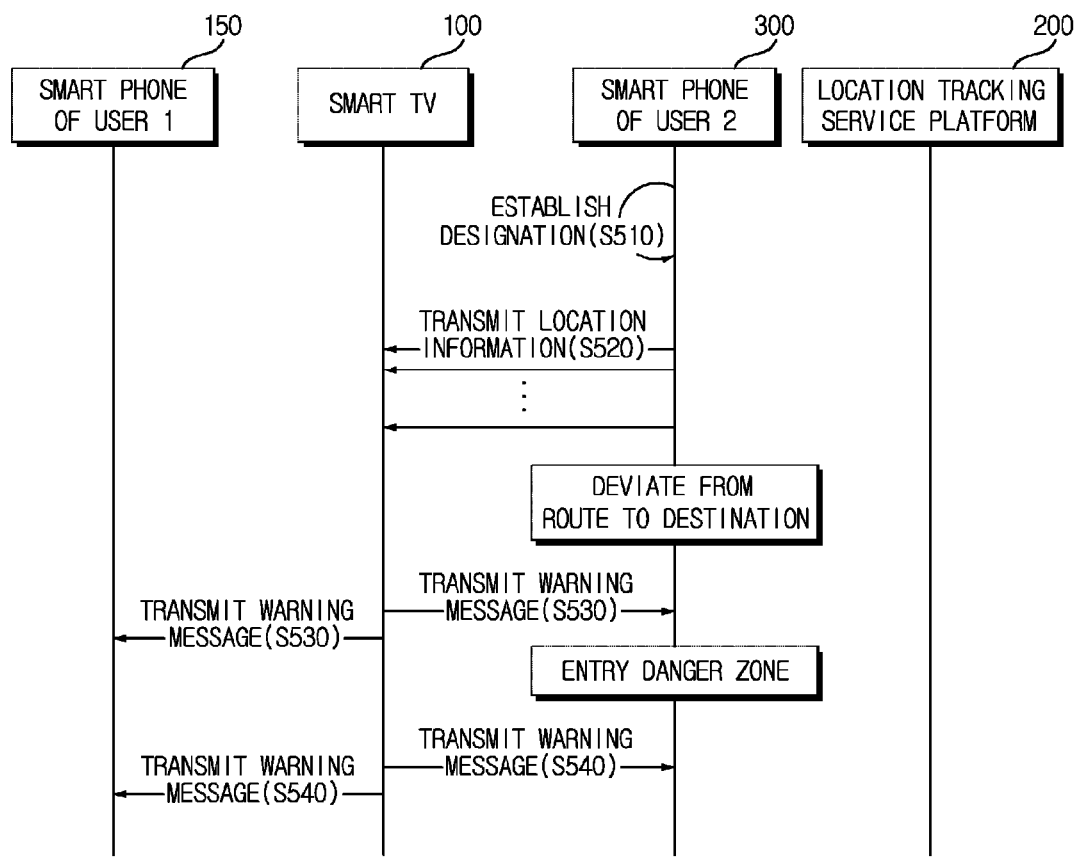
FIG. 5 is a flow chart showing a warning message transmission process of location information providers due to route deviation or a danger zone entry in the location tracking service according to the exemplary embodiment of the present invention.

FIG. 5 is a flow chart showing a warning message transmission process due to a route deviation or a danger zone entry of a location information provider in the location tracking service according to the exemplary embodiment of the present invention.

The smart phone 300 of user 2 establishes the destination to which user 2 wants to go (S510). For example, the destination may be established to any one of a school, a private educational institute, a home, and a church. The established destination information is transmitted to the smart TV 100 and a route to the corresponding destination is established. However, the destination is established in the smart TV 100 and the corresponding information may be transmitted to the smart phone 300.

The smart phone 300 periodically transmits the location information to the smart TV 100 as described in the location registration process of FIG. 3 (S520).

The smart TV 100 continues to monitor the location of the smart phone 300 and when the smart phone 300 deviates from a route to destinations, the smart TV 100 transmits a warning message to the smart phone 300 (S530). For example, a message "deviate from a route to destinations" is transmitted by the SMS character. Meanwhile, the smart TV 100 can transmit the warning message by the smart phone 150 of user 1 or the preset emergency phone number (S530).

A danger zone is previously established in the smart phone 300 and the smart TV 100 and thus, the smart TV 100 monitors the position of the smart phone 300 and when the smart phone 300 enters the danger zone, the smart TV 100 transmits the warning message to the smart phone 300. For example, a message "enter the danger zone" is transmitted by the SMS character. Meanwhile, the smart TV 100 can transmit the warning message by the smart phone 150 of user 1 or the preset emergency phone number (S540).

In the exemplary embodiment of the present invention, when the peer-to-peer communication cannot be performed between the smart TV 100 and the smart phone 300 according to the network environment, the aforementioned location information, warning message, or the like, are transmitted between the smart TV 100 and the smart phone 300 via the gateway server 240 of the location tracking service platform 200.

Figure 6:
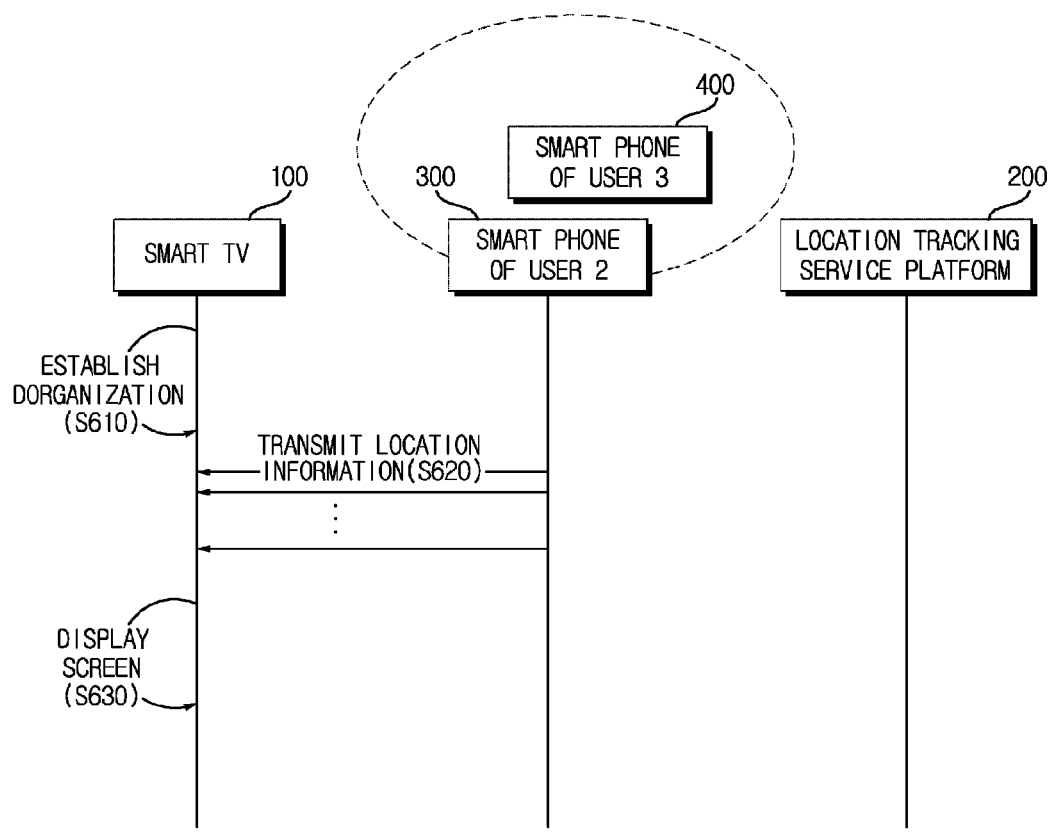
FIG. 6 is a service flow chart for tracking a location of an organization of the location information providers in the location tracking service according to the exemplary embodiment of the present invention.

FIG. 6 is a service flow chart for tracking a location of an organization of the location information providers in the location tracking service according to the exemplary embodiment of the present invention.

The smart TV 100 connects the smart phone 300 of user 2 with the smart phone 400 of user 3 so as to be established as an organization and establishes the smart phone 300 of user 2 to be a representative of the corresponding organization (S610). The smart phone 300 of user 2 periodically transmits the location information to the smart TV 100 as described in the location registration process of FIG. 3 (S620).

The smart TV 100 displays both the positions of user 2 and user 3 on the screen according to the location information received from the smart phone 300 of user 2. The smart phone 400 of user 3 does not need to transmit the location information to the smart TV 100 and thus, the amount of transmitted message is reduced.

In the exemplary embodiment of the present invention, when the peer-to-peer communication cannot be performed between the smart TV 100 and the smart phone 300 according to the network environment, the message such as the location information, or the like, are transmitted between the smart TV 100 and the smart phone 300 via the gateway server 240 of the location tracking service platform 200.

Figure 7:
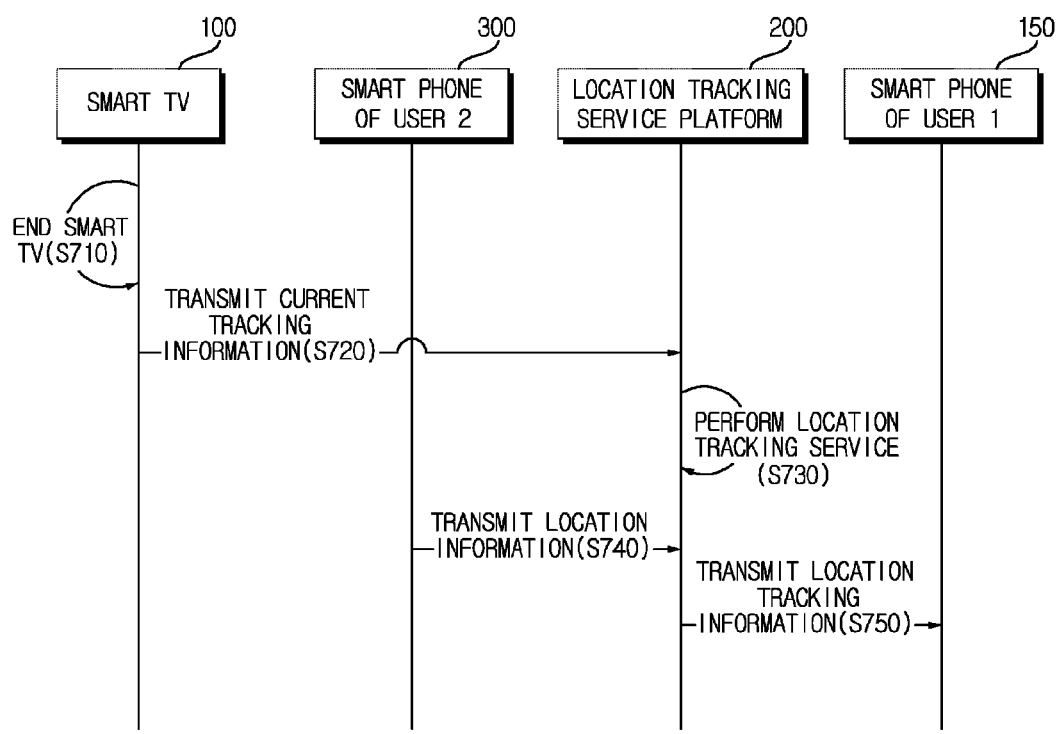
FIG. 7 is a backup service flow chart through a location tracking service platform when a smart TV ends in the location tracking service according to the exemplary embodiment of the present invention.

FIG. 7 is a backup service flow chart through a location tracking service platform when the smart TV ends in the location tracking service according to the exemplary embodiment of the present invention.

When the smart TV 100 ends (S710), the smart TV 100 transmits the current tracking information to the location tracking service platform 200 (S720). The current tracking information may include the smart TV information, the smart phone information that is the tracking object, the location information of the corresponding smart phone for a predetermined time of the present and the past, and the location tracking service contents (destination information, danger zone information, or the like). The location tracking service platform 200 receives the tracking information and instead performs the location tracking service performed by the smart TV 100 based on the received tracking information (S730).

As the smart TV 100 ends, the smart phone 300 of user 2 cannot transmit the location information to the smart TV 100 and thus, the smart phone 300 of user 2 transmits the location information to the gateway server 240 of the location tracking service platform 200 to register the location in the location tracking service platform 200 (S740).

The location tracking service platform 200 transmits the location tracking information to the smart phone 150 of user 1 so as for user 1 to confirm the location tracking results. Therefore, user 1 continues to receive the location tracking services performed in the smart TV 100 through the smart phone 150.

The location tracking service according to the exemplary embodiment of the present invention may be used in the case of the following cases.

The location tracking service can be used for a secured function by allowing parents to confirm the location of children and children to know the location of parents. In other words, parents are the location information requestor and children are the location information provider, and vice versa. If parents are the location information requestor and children are the location information provider, the warning message is transmitted to the smart phones of children and the smart phones of parents when the children deviate from the route to destinations or enter the danger zone. Location information of children, surrounding pictures or moving pictures, or CCTV videos around children are additionally provided to the smart TV or the smart phone of parents to confirm whether children are in a danger state and are going to destinations well.

When a person in self-employment are the position information requestor and delivery men are the location information provider, the location tracking service may be used for a delivery monitoring service that allows the person in self-employment to grasp the location of the delivery men in real time and confirms whether the delivery men deviates from the route to the designation.

When members belonging to the organization are gathered, unnecessary messages can be reduced by tracking the location of the organization through the location of the specific representative.

The exemplary embodiments of the present invention can prevent the location information from being published to other persons or the location information providers by directly transmitting the location information from the smart phone to the smart TV in the peer-to-peer communication scheme and coding and transmitting the location information.

According to exemplary embodiments of the present invention, it is possible to transmit the location information through the direct communication between the tracked terminal and the tracking terminal to reduce the unnecessary communication between the terminal and the server, thereby reducing the load of the server or the network and improving the efficiency.

Further, according to the exemplary embodiments of the present invention, it is possible to provide the system and method for tracking a location of a mobile terminal reducing the intervention of the location server or operating a service without the location server.

In addition, according to the exemplary embodiments of the present invention, it is possible to provide the system and method for tracking the location of the mobile terminal preventing the personal information such as the location information, or the like, from being published to other persons and the location information providers.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for tracking a location of a mobile terminal, comprising:
   a TV connected to the Internet via a fixed network; and
   a mobile terminal acquiring its own location information, wherein
      the mobile terminal periodically transmits its own location information to the TV in a peer-to-peer communication scheme, and
      the TV receives the location information and displays the received location information on a screen.

2. The system of claim 1, further comprising:
   a gateway server connected to the Internet,
   wherein the mobile terminal transmits the location information to the TV through the gateway server when the mobile terminal is not available to communicate with the TV in the peer-to-peer communication scheme.

3. The system of claim 1, wherein the mobile terminal encodes the location information to transmit the encoded location information to the TV.

4. The system of claim 1, wherein the TV transmits a location information request message to the mobile terminal, and the mobile terminal transmits the location information to the TV in response to the location information request message.

5. The system of claim 1, wherein when the mobile terminal deviates from a pre-established route, the TV transmits a warning message using a preset phone number.

6. The system of claim 1, wherein when the mobile terminal enters a pre-established area, the TV transmits a warning message using a preset phone number.

7. The system of claim 1, wherein the TV transmits an additional information request message to the mobile terminal, and the mobile terminal transmits pictures or moving pictures to the TV in response to the additional information request message.

8. The system of claim 1, further comprising:
   a location tracking service platform connected to the Internet, wherein
      the TV transmits a CCTV information request message to the location tracking service platform, and
      the location tracking service platform acquires videos photographed by CCTVs around the mobile terminal to transmit the acquired videos to the TV.

9. The system of claim 1, wherein the TV displays a location of another mobile terminal connected to the mobile terminal, together with the location of the mobile terminal.

10. The system of claim 1, wherein the fixed network is a non-mobile network.

11. A method for tracking a location of a mobile terminal, comprising:
- acquiring, by a mobile terminal, its own location information;
- periodically transmitting, by the mobile terminal, the location information to a TV, which is connected to the Internet via a fixed network, in a peer-to-peer communication scheme, and
- receiving, by the TV, the location information and displaying the received location information on a screen.

12. The method of claim 11, further comprising:
- transmitting the location information to the TV through a gateway server connected to the Internet when the mobile terminal is not available to communicate with the TV in the peer-to-peer communication scheme.

13. The method of claim 11, further comprising:
- transmitting, by the TV, a location information request message to the mobile terminal; and
- transmitting, by the mobile terminal, the location information to the TV in response to the location information request message in the peer-to-peer communication scheme.

14. The method of claim 11, further comprising:
- transmitting, by the TV, a warning message using a preset phone number when the mobile terminal deviates from a pre-established route.

15. The method of claim 11, further comprising:
- transmitting, by the TV, a warning message using a preset phone number when the mobile terminal enters a pre-established area.

16. The method of claim 11, further comprising:
- transmitting, by the TV, an additional information request message to the mobile terminal, and
- transmitting, by the mobile terminal, pictures or moving pictures to the TV in response to the additional information request message.

17. The method of claim 11, further comprising:
- transmitting, by the TV, a CCTV information request message to a location tracking service platform connected to the Internet; and
- acquiring, by the location tracking service platform, videos photographed by CCTVs around the mobile terminal to transmit the acquired videos to the TV.

18. The method of claim 11, wherein the fixed network is a non-mobile network.

\* \* \* \* \*